United States Patent Office 3,352,810
Patented Nov. 14, 1967

3,352,810
EPOXY RESIN COMPOSITIONS
Grant McLay Cameron and Angus John Duke, Cambridge, England, assignors to Ciba Limited, Basel, Switzerland, a company of Switzerland
No Drawing. Filed Sept. 14, 1965, Ser. No. 487,317
Claims priority, application Great Britain, Oct. 2, 1964, 4,030/64
5 Claims. (Cl. 260—30.8)

ABSTRACT OF THE DISCLOSURE

Cured epoxy resins of improved properties, particularly superior flexibility, are obtained from curable compositions comprising an epoxide resin, a curing agent therefor and, as a flexibilizer, an ester, containing two or more mercaptan groups, of a mercapto carboxylic acid with an organic compound containing at least two alcoholic hydroxyl groups separated from each other by a linear chain of at least seven consecutive carbon or carbon and oxygen atoms.

---

This invention relates to epoxy resin compositions containing flexibilisers.

It has previously been proposed to prepare flexible cured epoxy resin compositions from epoxy resins (i.e., compounds or mixtures of compounds having on average more than one 1,2-epoxide group per molecule), containing long chains of carbon atoms, such as the epoxidised unsaturated fatty acid glycerides, e.g., epoxidized soya bean oil, or polyglycidyl ethers of polyalkylene glycols. It is also known to prepare such compositions by using curing agents containing such chains, e.g., polysebacic anhydride or aminoamides prepared by the reaction of dimerised unsaturated higher fatty acids with aliphatic polyamines. The range of mechanical and physical properties exhibited by such compositions is, however, somewhat limited.

It has further been proposed to prepare flexible compositions by the addition to conventional epoxy resin-hardener systems of resinous or semi-resinous materials which also contain groups capable of reaction with the epoxide groups. Such materials include poly(alkylene oxides) (also called polyalkylene glycols) and polysulphides obtained by the reaction of dichlorodiethyl formal with an alkali metal polysulphide, for example that available commercially under the designation "Thiokol LP3" which may be represented by the general formula:

$$HS(C_2H_4O.CH_2OC_2H_4S.S)_nC_2H_4O.CH_2O.C_2H_4SH$$

where $n$ is an integer having an average value of approximately 6.

For some applications, however, the addition of polyalkylene glycols or such polysulphides is disadvantageous. Thus, the former substances do not react with epoxy resins when incorporated in cold-setting aliphatic polyamine-epoxy resin systems, and the chemical-and-water-resistance of epoxy resin formulations containing them is therefore inferior. The commercially-available polysulphides have strong odours, and their viscosities are inconveniently high for some applications. Cured epoxy resin compositions prepared from these polysulphides have low tear-strengths and tend to become brittle with age. Further, the mechanical properties of anhydride cured-epoxy resin formulations containing such polysulphides are frequently unsatisfactory.

It has now been found that the use, as flexibilisers, of esters of long-chain polyhydric alcohols with mercapto-carboxylic acids (i.e., acids containing both a carboxyl and a mercapto group) affords cured-epoxy resins having superior flexibility and other properties.

According to the present invention, therefore, there are provided curable compositions comprising an epoxide resin, a curing agent therefore, and an ester, containing two or more mercaptan groups, of a mercaptocarboxylic acid with an organic compound containing at least two alcoholic hydroxyl groups separated from each other by a linear chain of at least seven consecutive carbon or carbon and oxygen atoms. Flexibilised products obtained by curing the aforesaid compositions are also within the scope of the present invention.

Particularly suitable esters containing two or more mercaptan groups may be represented by the general formula:

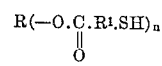

wherein R denotes a hydrocarbyl group, which may contain oxygen atoms in the chain, $R^1$ denotes an alkylene group, and $n$ denotes an integer of at least 2. It will be understood that the positions of at least two of the

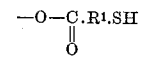

groups attached to the hydrocarbyl group are such that the groups are separated from each other by a linear chain of at least seven consecutive atoms as aforesaid. The polyhydric alcohol component of the esters may be, for example tri-ethylene glycol. Preferably R denotes the residue, after removal of at least two hydroxyl groups, of a poly(alkylene oxide), especially of such hydroxyl-terminated oligomers as polyethylene glycol, polypropylene glycol, mixed polyethylene polypropylene glycols, and analogues containing three or more hydroxyl groups formed by the addition of an alkylene oxide to a triol or higher polyol, e.g., glycerol. Particularly suitable residues are those derived from polypropylene glycols or triols having an average molecular weight within the range 300 to 2500.

The mercaptocarboxylic acids utilized in the preparation of the mercaptan-containing ester include, for example, thioglycollic acid (2-mercapto-acetic acid), 2-mercaptopropionic acid, 3-mercaptopropionic acid, mercapto-undecylic acid, mercaptostearic acid and o-mercaptobenzoic acid. Preferably, thioglycollic acid or 3-mercaptopropionic acid is employed, i.e., in the above general formula, $R^1$ preferably denotes a —$CH_2$— or

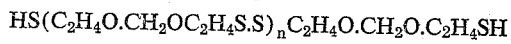

group.

It is within the scope of the invention to employ esters of the type hereinbefore specified which also contain one or more free carboxyl or hydroxyl groups.

The esters may be prepared in a conventional manner, e.g., by reaction of the polyhydric alcoholic component with the mercaptocarboxylic acid in the presence of an acid catalyst, the water formed during the reaction being removed as an azeotrope with a water-immiscible solvent.

Specific preferred esters for use in the compositions of the present invention are bis(thioglycollates) and bis(3-mercaptopropionates) of polyethylene glycols and polypropylene glycols, and tris(thioglycollates) and tris(3-mercaptopropionates) of polypropylene triols, wherein the said polyols have an average molecular weight within the range 300 to 2500.

In order to impart additional cross-linking in systems when bis(mercapto esters) are employed, a quantity of a tris(mercapto ester) may be incorporated.

Epoxy resins which may be used in these compositions include, for example, polyglycidyl esters, such as those obtainable by the reaction of a di- or poly-carboxylic acid with epichlorohydrin or glycerol dichlorohydrin in the presence of an alkali. Such polyglycidyl esters may be derived from aliphatic dicarboxylic acids, e.g., oxalic acid, succinic acid, glutaric acid, adipic acid, pimelic acid, suberic acid, azelaic acid, sebacic acid, or dimerised or trimerised linoleic acid, but are preferably derived from aromatic dicarboxylic acids such as phthalic acid, isophthalic acid, terephthalic acid, naphthalene-2,6-dicarboxylic acid, diphenyl-o,o'-dicarboxylic acid and ethylene glycol bis(p-carboxyphenyl)ether. Specific such polyglycidyl esters are, for example, diglycidyl phthalate, diglycidyl adipate and those diglycidyl esters which correspond to the average formula:

$$CH\underset{O}{-}CH-CH_2-(OOC-A-COO-CH_2-CHOH-CH_2-)_p-OOC-A-COO-CH_2-CH\underset{O}{-}CH_2$$

in which A represents a divalent aromatic hydrocarbon radical, such as a phenylene group, and $p$ represents a small whole or fractional number.

Other epoxy resins which may be used include polyglycidyl ethers, such as those obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be derived from diols or polyols, such as ethylene glycol, diethylene glycol, triethylene glycol, propane-1,2-diol, propane-1,3-diol, butane-1,4-diol, pentane-1,5-diol, hexane-1,6-diol, hexane-2,4,6-triol, glycerol or N-aryl-dialkanolamines such as N-phenyldiethanolamine, or, preferably, from dihydric or polyhydric phenols such as resorcinol, catechol, hydroquinone, 1,4-dihydroxynaphthalene, 1,5-dihydroxynaphthalene, bis(4-hydroxyphenyl)methane, bis(4-hydroxyphenyl)methylphenylmethane, bis(4-hydroxyphenyl)-tolymethanes, 4,4'-dihydroxydiphenyl, bis(4-hydroxyphenyl)sulphone and, especially, 2,2-bis(4-hydroxyphenyl)propane or phenolformaldehyde condensation products.

There may further be employed aminopolyepoxides such as are, for example, obtained by the dehydrohalogenation of the reaction products of epihalohydrins and primary or disecondary amines such as aniline, n-butylamine or bis(4-methylaminophenyl)methane, and products obtained by the partial or complete epoxidation of cyclic or acylic polyolefins.

Especially suitable epoxy resins are those obtained from 2,2-bis(4-hydroxyphenyl)propane which have an epoxide content of about 3.8 to 5.88 epoxide equivalents per kilogram.

As curing agents to be used in the epoxy resin compositions of the present invention there may be mentioned those conventionally employed as cross-linking agents for epoxy resins, for example amines containing at least two hydrogen atoms directly attached to nitrogen, e.g., aliphatic and aromatic primary and secondary amines such as mono- and di-butylamine, p-phenylenediamine, bis(p-aminophenyl)methane, ethylenediamine, N,N-diethyl-ethylenediamine, diethylenetriamine, tetra(hydroxyethyl)diethylenetriamine, triethylenetetramine, tetraethylenepentamine, piperidine, guanidine, and guanidine derivatives, such as phenylguanidine and diphenylguanidine, dicyandiamide, anilineformaldehyde resins, polymers of aminostyrenes, and polyamino-amides, e.g., those prepared from aliphatic polyamines and dimerised or trimerised unsaturated fatty acids; isocyanates and isothiocyanates; polyhydric phenols, e.g., resorcinol, hydroquinone, 2,2-bis(4-hydroxyphenyl)propane, phenol-aldehyde resins and oil-modified phenol-aldehyde resins; reaction products of aluminum alkoxides or phenolates with tautomeric-reacting compounds of the acetoacetic ester type; Friedel-Crafts catalysts, e.g., $AlCl_3$, $SnCl_4$, $ZnCl_2$, $BF_3$, and their complexes with organic compounds; phosphoric acid; and polycarboxylic acids and their anhydrides, e.g., phthalic anhydride, methylendomethylenetetrahydrophthalic anhydride, dodecenylsuccinic anhydride, hexahydrophthalic anhydride, hexachloroendomethylenetetrahydrophthalic anhydrides or endomethylenetetrahydrophthalic anhydride, or their mixtures, or maleic or succinic anhydrides.

There may also be used catalytic hardeners, e.g., tertiary amines such as 2,4,6-tris(dimethylaminomethyl)phenol, triethanolamines, or N-benzyldimethylamines; alkali metal alkoxides of alcohols such as 2,4-dihydroxy-3-hydroxymethylpentane; stannous salts of alkanoic acids, such as stannous octoate; aluminum alkoxides; and triphenylphosphine.

The compositions of the present invention may contain reactive diluents such as phenyl glycidyl ether, allyl glycidyl ether, glycidyl methacrylate, glycidyl acryate or n-butyl glycidyl ether. They may also contain fillers, other plasticisers, and colouring agents, for example asphalt, bitumen, glass fibres, mica, quartz powder, cellulose, kaolin, finely-divided silica such as that available under the registered trademark "Aerosil," or metal powder. The aforesaid compositions may be used as flexibilised dipping, casting, potting, encapsulating, coating or adhesive resins and the like. They are especially valuable for the production of flexible products used in caulking, cable-jointing and civil engineering applications.

The flexibilising agents employed in the examples were prepared as follows:

"FLEXIBILISER A"

A mixture of polypropylene glycol of average molecular weight 425 (850 g., 2 mol.), thioglycollic acid (368 g., 4 mol.), toluene-p-sulphonic acid (3 g.) and benzene (500 ml.) was heated to reflux with stirring in an atmosphere of nitrogen. Water (72 ml., 4 mol.) formed during the reaction was removed as its azeotrope. The reaction mixture was cooled, washed with water and the organic layer separated. On removal under vacuum of the solvent from the organic layer there remained 1106 g. (96% of the theoretical yield) of polypropylene glycol-425 bis-(thioglycollate), having a refractive index, $n_D^{25}=1.4689$, and a mercaptan content of 3.45 equiv./kg. (theory is 3.49).

"FLEXIBILISER B"

A mixture of polypropylene triol of average molecular weight 700 (700 g., 1 mol.) available from Dow Chemical Company under the designation "Voranol 700," thioglycollic acid (276 g., 3 mol.), toluene-p-sulphonic acid (3 g.) and benzene (500 ml.) was heated, and the liberated water (54 ml., 3 mol.) removed, as described previously. There was obtained in a similar manner 915 g. (99% of the theoretical yield) of polypropylene triol-700 tris(thioglycollate), having a refractive index $n_D^{25}=1.4741$, and a mercaptan content of 3.26 equiv./kg. (theory is 3.25).

"FLEXIBILISER C"

A mixture of polypropylene glycol of average molecular weight 425 (212.5 g., 0.5 mol.), 3-mercaptopropionic acid (106 g., 1 mol.), concentrated sulphuric acid (2 ml.) and benzene (250 ml.) was heated as previously described, 18 ml. (1 mol.) of water being recovered. On working up the residue there was obtained 277 g. (92% of the theoretical yield) of polypropylene glycol-425 bis(3-mercaptopropionate), having a refractive index $n_D^{25}=1.4680$, and a mercaptan content of 3.32 equiv./kg. (theory is 3.33).

"FLEXIBILISER D"

This is the sulphur-containing oligomer, substantially free from ester groups, commercially available under the designation "Thiokol LP3". ("Thiokol" is a registered trademark.)

"FLEXIBILISER E"

A mixture of polypropylene triol of average molecular weight 700 (1050 g., 1.5 mol.), 3-mercaptopropionic acid (477 g., 4.5 mol.), toluene-p-sulphonic acid (5 g.) and toluene (300 ml.) was heated as previously described until the theoretical amount of water (81 ml.) had been removed. On working up the residue there was obtained 1422 g. (98% of the theoretical yield) of polypropylene triol tris(3-mercaptopropionate) with a mercaptan content of 2.98 equiv./kg. (theory is 3.11).

"FLEXIBILISER F"

A mixture of polyfunctional primary alcohol having a molecular weight of ca. 700 (made by catalytic hydrogenation of methyl esters of long-chain aromatic-aliphatic fatty acids and commercially available under the designation "Comerginol 65") (666 g., ca. 0.95 mol.), 3-mercaptopropionic acid (212 g., 2 mol.), toluene-p-sulphonic acid (3 g.) and toluene (300 ml.) was heated as previously described, 34 ml. of water being recovered. On working up the residue, there was obtained 790 g. (94% of the theoretical yield) of Comerginol 65 bis(3-mercaptopropionate), having a mercaptan content of 2.19 equiv./kg. (theory is 2.25).

"FLEXIBILISER G"

A mixture of polypropylene triol of average molecular weight 1000 (2 kg., 2 mol.), 3-mercaptopropionic acid (636 g., 6 mol.), toluene-p-sulphonic acid (10 g.) and xylene (1000 ml.) was heated as previously described, 109 ml. of water being recovered. On working up the residue there was obtained 2479 g. (98% of the theoretical yield) of polypropylene triol 1000 tris(3-mercapto-propionate) having a mercaptan content of 2.19 equiv./kg. (theory is 2.38).

"FLEXIBILISER H"

This denotes a polypropylene glycol having an average molecular weight of 425.

The following examples further illustrate the invention, "Parts" denotes parts by weight. Elongation values and tensile strengths of the castings were determined according to ASTM Specification D638–617, and water absorption and resistance of the castings (after immersion for 7 days at 25° C.) according to British Plastics Federation Specification ZA166ADB107. Gel-times were determined with 30 g.-samples of the curable mixtures at 25° C. by means of a "Techne" gelation timer.

Example I

Mixtures, each containing a liquid epoxy resin (100 parts) hereinafter designated "Epoxy resin I," having an epoxide content of 5.2 equiv./kg. and prepared in a conventional manner from 2,2 - bis(p - hydroxyphenyl)propane and epichlorohydrin, 100 parts of Flexibiliser A, Flexibiliser B or Flexibiliser C, and 2,4,6 - tris(dimethylaminomethyl) - phenol (10 parts) were cured at room temperature for 24 hours. The resultant coatings were in each case light-coloured, tough and flexible.

Example II

Mixtures, each containing Epoxy resin I (100 parts), 100 parts of the indicated Flexibiliser and 10 parts of 2,4,6 - tris(dimethylaminomethyl)phenol (10 parts) were cured at room temperature for 7 days. Elongation values and tensile strengths of the resultant castings were:

| Flexibiliser | Elongation, percent | Tensile Strength, kg./sq. cm. |
| --- | --- | --- |
| Flexibiliser A | 125 | 22.7 |
| Flexibiliser B | 120 | 54 |
| Flexibiliser D | 22 | 206 |

The product cured with Flexibiliser D had a water resistance of 2.2%.

Example III

A mixture of Epoxy resin I (100 parts), Flexibiliser A (50 parts), bis(4 - aminophenyl)methane (18 parts) and 2 - methoxyethyl hydrogen maleate (2 parts) was cured at room temperature for 7 days. The cured product had a tensile strength of 225 kg./sq.cm., an elongation value of 19%, and a water resistance of 0.9%.

Example IV

A mixture of Epoxy resin I (100 parts), Flexibiliser E (50 parts) and triethylenetetramine (11 parts) was cured at room temperature for 7 days. The cured product had a tensile strength of 197 kg./sq.cm., an elongation value of 54%, and a water resistance of 1.03%. A cured product, obtained in a similar manner from a mixture of Epoxy resin I (100 parts), Flexibiliser D (67 parts) and triethylenetetramine (9.5 parts), had a tensile strength of 221 kg./sq.cm. and an elongation value of 19%.

Example V

Mixtures containing Epoxy resin I (100 parts), Flexibiliser E (75 parts), and either a mixture of long chain aliphatic diprimary amines available from Badische Anilin- und Soda-Fabrik under the commercial designation "Laromin LR 1035" (30 parts) or a cycloaliphatic diprimary amine available from Badische Anilin- und Soda-Fabrik under the commercial designation "Laromin C260" (27 parts), were cured at room temperature for 7 days. The cured products prepared with the two curing agents had the following properties:

| Hardening Agent | Elongation, percent | Tensile Strength, kg./sq. cm. | Water Resistance, percent |
| --- | --- | --- | --- |
| "Laremin LR 1035" | 110 | 66 | 1.1 |
| "Laromin C260" | 109 | 104 | 1.23 |

Example VI

A mixture of Epoxy resin I (100 parts), Flexibiliser F (100 parts) and "Laromin LR 1035" (35 parts) had a gel-time of 250 minutes. A further sample, after curing at room temperature for 7 days, had a tensile strength of 21 kg./sq.cm. and an elongation value of 190%.

Example VII

Mixtures, each containing Epoxy resin I (100 parts), triethylenetetramine (10 parts), and the indicated quantity of Flexibiliser G, were cured for 7 days at room temperature to give tough, flexible products with the following properties:

| Amount of flexibiliser used | Water Absorption, Percent | Water Resistance, Percent |
| --- | --- | --- |
| 70 parts | 1.15 | 2.12 |
| 80 parts | 2.34 | 2.34 |
| 90 parts | 2.59 | 2.59 |

Example VIII

A mixture was prepared comprising Epoxy resin I (100 parts), Flexibiliser E (75 parts), triethylenetetramine (10 parts) and di - n - butyl phthalate (15 parts). A sample of the mixture had, 15 minutes after preparation, a viscosity of 15 poises at 25° C. The gel-time of the mixture was 2 hours, 16 minutes. After being cured for 7 days at room temperature, the product had a tensile strength of 25 kg./sq.cm., an elongation value of 34%, a water absorption of 2.06% and a water resistance of 3.03%.

*Example IX*

A mixture of Epoxy resin I (100 parts), Flexibiliser E (70 parts) and N - (2 - aminoethyl)piperazine (10 parts) had a gel-time of 227 minutes. A further sample, after curing at room temperature for 7 days, had a tensile strength of 55 kg./sq.cm. and an elongation value of 203%.

*Example X*

A product obtained by curing a mixture of Epoxy resin I (100 parts), Flexibiliser F (50 parts), bis(4 - aminophenyl)methane (21.6 parts) and γ - butyrolactone (18.4 parts) for 7 days at room temperature had a tensile strength of 77 kg./sq.cm. and an elongation value of 85%.

*Example XI*

A mixture of Epoxy resin I (50 parts), hexahydrophthalic anhydride (42.5 parts), N - benzyldimethylamine (1 part), and 25 parts of the indicated Flexibiliser was heated for 2 hours at 100° C. and then for 3 hours at 140° C. The product so obtained, tested in accordance with A.S.T.M. Specification D790–63, had the following properties:

| Flexibiliser | Flexural yield strength, kg./sq. cm. | Flexural modulus, kg./sq. cm. |
| --- | --- | --- |
| Flexibiliser A | 1,040 | 30,500 |
| Flexibiliser B | 1,050 | 30,800 |
| Flexibiliser H | 820 | 23,800 |

*Example XII*

A mixture of a solid Epoxy resin (100 parts) having an epoxide content of 5.78 equiv./kg. and prepared in conventional manner from 2,2 - bis(p - hydroxyphenyl) propane and epichlorohydrin, Flexibiliser E (75 parts) and triethylenetetramine (10 parts) had a gel-time of 2 hours, 37 minutes.

*Example XIII*

In a mixture of Epoxy resin I (100 parts), Flexibiliser E (60 parts) and a polyamine-amide hardener commercially available under the designation "Versamid 140" was prepared. ("Versamid" is a registered trademark). The mixture had a viscosity, 15 minutes after preparation, of 52 poises at 25° C. and a gel-time of 2 hours 24 minutes.

What is claimed is:

1. Curable compositions comprising (1) a 1,2 - epoxy resin having a 1,2 - epoxy having an epoxide content of about 3.8 to 5.88 epoxide equivalence per kilogram and selected from the group consist of polyglycidyl esters, polyglycidyl ether and amino polyepoxides (2) a curing agent therefor, and (3), as a flexibilizer, an ester of a mercaptocarboxylic acid with a polyol wherein said ester is of the general formula

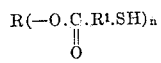

where R denotes a hydrocarbyl group of at least 7 consecutive atoms said chain containing at least 3 carbon atoms and the atoms of the chain selected from the group consisting of carbon and oxygen, said hydrocarbyl group containing no consecutive oxygen atoms, $R^1$ denotes an alkylene group and $n$ denotes an integer of at least 2 and at most 6.

2. Curable compositions according to claim 1, wherein R denotes the residue, after removal of at least two hydroxyl groups, of a poly (alkylene oxide).

3. Curable compositions according to claim 2, wherein R represents a residue derived from a polypropylene triol having an average molecular weight within the range of 300 to 2500.

4. Curable compositions according to claim 1, wherein $R^1$ denotes a member of the group consisting of —$CH_2$— and —$CH_2$—$CH_2$—.

5. Curable compositions according to claim 1, wherein the ester is composed of an acid moiety selected from the group consisting of thioglycollate and 3 - mercaptopropionate and the alcohol moiety is selected from the group consisting of poly(ethylene glycol), poly(propyleneglycol), and poly - (propylene - triol), the said polyol moieties having an average molecular weight within the range from 300 to 2500.

References Cited

UNITED STATES PATENTS

| | | | |
|---|---|---|---|
| 2,530,872 | 10/1950 | Gregory | 260—308 |
| 2,602,815 | 10/1952 | Gregory | 260—308 |
| 2,789,958 | 4/1957 | Fettes | 260—308 |
| 2,858,291 | 10//1959 | McAdam | 260—308 |

OTHER REFERENCES

Skeist: "Epoxy Resins," 1958, pp. 61, 62, 64, 71, 122, 164.

JULIUS FROME, *Primary Examiner.*